(12) United States Patent
Adir et al.

(10) Patent No.: US 8,352,525 B2
(45) Date of Patent: Jan. 8, 2013

(54) GENERATING A NUMBER BASED ON A BITSET CONSTRAINT

(75) Inventors: Allon Adir, Kiryat Tivon (IL); Ehud Aharoni, Kfar Saba (IL); Oded Margalit, Ramat Gan (IL)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 12/239,783

(22) Filed: Sep. 28, 2008

(65) Prior Publication Data

US 2010/0082719 A1  Apr. 1, 2010

(51) Int. Cl.
G06F 1/02 (2006.01)
G06F 7/58 (2006.01)
(52) U.S. Cl. ........................................ 708/254; 708/250
(58) Field of Classification Search .................. None
See application file for complete search history.

(56) References Cited

U.S. PATENT DOCUMENTS

| 5,930,291 A | * | 7/1999 | Hines | 375/133 |
| 8,244,784 B2 | * | 8/2012 | Aharoni et al. | 708/250 |
| 2006/0047735 A1 | * | 3/2006 | Nunes | 708/250 |

OTHER PUBLICATIONS

Micah Dowty, "Various methods of generating noise quickly using Numeric", Copyright 2003-2006, Source: http://svn.navi.cx/misc/trunk/pybzengine/BZEngine/Noise.py.

Giles Cotter, "Generation of Pseudorandom numbers from microphone input in computing devices", University of Virginia, Mar. 2002 Source: http://www.cs.virginia.edu/~evans/theses/cotter.pdf.

Computational Science Education Project, "Random Numbers", Copyright 1991, 1992, 1993, 1994, 1995 Source: http://www.utdallas.edu/~cantrell/ee6481/rn.pdf.

* cited by examiner

Primary Examiner — Lewis A Bullock, Jr.
Assistant Examiner — Mark Gooray

(57) ABSTRACT

Generating a number based on a bitset constraints. For example, a method of generating a pseudo random number satisfying a bitset constraint may include determining a number of possible solutions satisfying the bitset constraint; selecting an index representing a solution of the possible solutions; and generating the pseudo-random number based on the index. Other embodiments are described and claimed.

17 Claims, 4 Drawing Sheets

GENERATING A NUMBER BASED ON A BITSET CONSTRAINT

FIELD

Some embodiments are related to the field of pseudo-randomly generating a number satisfying a bitset constraint.

BACKGROUND

Generation of random or pseudo-random numbers is a fundamental building stone in many applications. For example, pseudo random generation of a number may be required in context of Pseudo Random Test Generators (PRTGs) for hardware verification. Hardware verification may involve generating pseudo random op-code instructions, and may require pseudo random generation of numbers that satisfy one or more constraints, e.g., a bitset constraint. The constraints may arise, for example, from hardware architecture, as well as from a user specification. The pseudo randomly generated numbers may be required to be selected, e.g., with a uniform distribution, from a set of all valid numbers that satisfy the one or more constraints.

The implementation of the bitset constraint may enable performing some computations relatively efficiently. For example, the implementation of the bitset constraint may enable using a single Boolean manipulating machine instruction to perform set operations, e.g., union (logical OR), intersection (logical AND), complement (logical negation), membership checking (bit check), and the like. The bitset constraint may be implemented, for example, if the size of a domain, which corresponds to a set of numbers that possibly satisfy the bitset constraint, does not exceed a word size of a machine or device performing the computations. For example, a 32-bit machine word-size may enable using a bitset constraint to represent a domain of the numbers 0-31.

Some computing systems, for example, computing systems including post-silicon PRTGs, may require generating pseudo random numbers while consuming relatively short computing time and/or small memory space.

SUMMARY

Some embodiments include, for example, devices, systems and methods of pseudo random number generation.

Some embodiments include, for example, a method of generating a pseudo random number satisfying a bitset constraint.

In some embodiments, the method includes determining a number of possible solutions satisfying the bitset constraint; selecting an index representing a solution of the possible solutions; and generating the pseudo-random number based on the index.

In some embodiments, determining the number of possible solutions satisfying the bitset constraint may include determining an intermediate number representing a possible solution based on a non-zero least-significant-bit (LSB) of the bitset; increasing a total number of possible solutions; modifying the bitset based on the intermediate number; and repeating the determining, increasing, and modifying for one or more other non-zero LSBs of the bitset.

In some embodiments, determining the intermediate number may include applying a bitwise AND operator to the bitset and a two-complementary representation of a negative of the bitset.

In some embodiments, the intermediate number is equal to two to the power of an index of the non-zero LSB.

In some embodiments, the modifying of the bitset may include subtracting the intermediate number from the bitset.

In some embodiments, generating the pseudo-random number based on the index may include determining a solution number based on the index; and extracting a base two logarithm from the solution number.

In some embodiments, determining the solution number may include determining an intermediate number based on a non-zero LSB of the bitset; modifying the bitset based on the intermediate number; and repeating the determining and modifying for a number of times corresponding to the index.

In some embodiments, extracting the base two logarithm may include determining a first number based on a word size of the bitset; setting a second number to be equal to the solution number right shifted by the first number; if the second number is greater than zero, adding the first number to a third number, and setting the solution number to be equal to the second number; dividing the first number by two; repeating the setting of the second number, the adding, the setting of the solution number, and the dividing while the solution number is greater than one; and generating the pseudo-random number equal to the third number.

In some embodiments, the method may include determining the number of possible solutions and generating the pseudo random number using a common algorithm.

Some embodiments include an apparatus including a pseudo random number generator to generate a pseudo random number satisfying a bitset constraint by determining a number of possible solutions satisfying the bitset constraint; selecting an index representing a solution of the possible solutions; and generating the pseudo-random number based on the index.

Some embodiments include a computer program product including a computer-useable medium including a computer-readable program, wherein the computer-readable program when executed on a computer causes the computer to generate a pseudo random number satisfying a bitset constraint by determining a number of possible solutions satisfying the bitset constraint; selecting an index representing a solution of the possible solutions; and generating the pseudo-random number based on the index.

Some embodiments may include, for example, a computer program product including a computer-useable medium including a computer-readable program, wherein the computer-readable program when executed on a computer causes the computer to perform methods in accordance with some embodiments of the invention.

Some embodiments may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
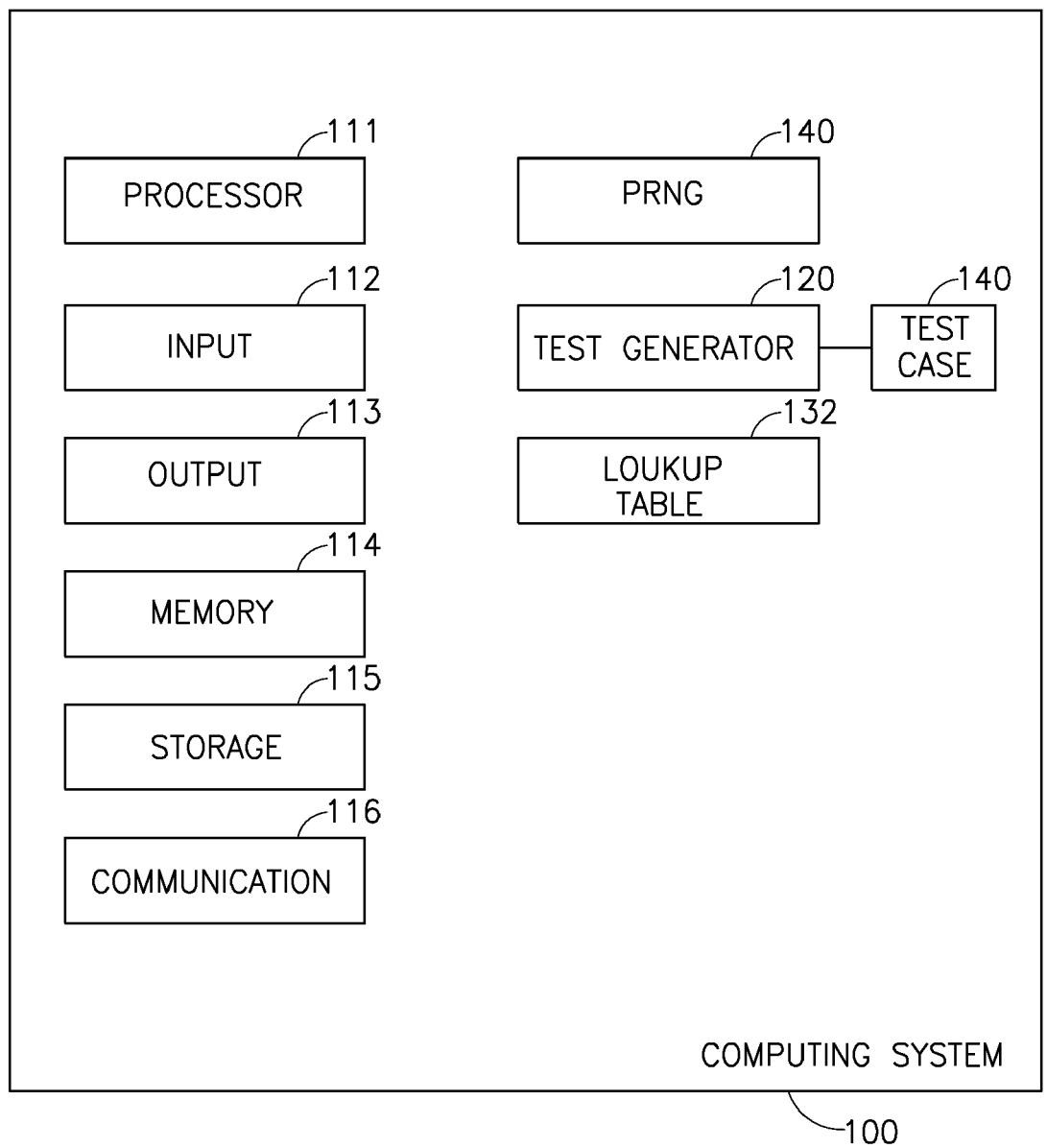
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein includes, for example, "multiple" or "two or more". For example, "a plurality of items" includes two or more items.

The terms "random" and "pseudo-random" as used herein includes, for example, random, pseudo-random, unpredictable and/or haphazard. The terms "random" and/or "pseudo-random" as used herein may relate, for example, to one or more items or numbers that lack order, that appear to lack a pattern, that lack predictability, that appear to lack predictability, that lack a definitive pattern, that are haphazard or appear to be haphazard, that are generated or produced by a process whose output does not follow a describable pattern or a deterministic pattern, that do not follow a deterministic rule, that appear to not follow a deterministic rule, that appear to be chaotic or disorganized, or the like.

At an overview, some embodiments provide devices, systems and/or methods of pseudo randomly generating a natural number that satisfies a bitset constraint ("bitset").

A bitset, denoted B, may include for example, an N-bit binary string representing one or more subsets of a set of N numbers, e.g., the set of the numbers 0 ... (N−1). An i-th bit of a number X may be denoted X(i), wherein X(0) denotes the first least significant bit of the number X. A number x satisfies the bitset constraint B if and only if B(x) equals "1". For example, a constraint may be represented by a 16-bit binary bitset string B=0011001100000000, wherein the bits of the bitset B having the indices eight, nine, twelve and thirteen have a value "1", and other bits of B have a value "0". This bitset may indicate that the decimal numbers eight, nine, twelve and thirteen as represented by their respective 4-bit binary strings, "1000", "1001", "1100', and "1101", respectively, satisfy the bitset constraint.

Additionally or alternatively, the bitset constraint may be used to represent sets of up to N members which are not necessarily the numbers 0 ... (N−1), for example, by maintaining an accompanying mapping from the numbers 0 ... (N−1) to the desired members.

Some embodiments may include a method of pseudo randomly generating a number according to the predefined bitset constraint such that, for example, the number is generated with a uniform distribution over a set of all valid numbers that satisfy the bitset constraint ("the set of possible solutions").

In some embodiments, the method may include determining a number of possible solutions satisfying the bitset constraint; selecting an index representing a solution of the possible solutions; and generating the pseudo-random number based on the selected index.

In some embodiments, determining the number of possible solutions satisfying the bitset constraint may include performing a first counting iteration to determine the number of possible solutions satisfying the bitset constraint, e.g., by iterating through all non zero bits of the bitset. For example, the first counting iteration may include determining an intermediate number representing a possible solution based on a non-zero least-significant-bit (LSB) of the bitset, for example, determining the intermediate number to be two to the power of the index of the non-zero LSB, e.g., by applying a bitwise AND operator to bitset and a two-complementary representation of a negative of the bitset; increasing a total number of possible solutions. The first counting iteration may also include modifying the bitset based on the intermediate number, for example, by subtracting the intermediate number from the bitset. The first counting iteration may also include repeating the determining, increasing, and modifying for one or more other non-zero LSBs of the bitset, e.g., until iterated over substantially every non-zero bit of the bitset.

In some embodiments, selecting the index representing a solution of the possible solutions may include pseudo randomly selecting an index number, denoted i, from a set of numbers having a size corresponding to the total number of the counted possible solutions. The selected index i may represent or correspond to, for example, a solution from the possible solutions ("the i-th solution").

In some embodiments, generating the pseudo-random number based on the index may include determining a solution number based on the index; and extracting a base two logarithm from the solution number.

In some embodiments, determining the solution number may include performing a second counting iteration of the possible solutions, e.g., until reaching the i-th solution.

In some embodiments, the first and the second counting iterations may be performed using a common or similar algorithm, executed using common or similar code and/or executed re-using the same ("used") code.

In some embodiments, the solution number may be determined based on the bitset constraint within a time period corresponding to a time complexity of no more than an order of n, wherein n denotes the number of non-zero bits of the bitset ("the hamming weight of the bitset"), for example, with an order constant of less than ten; and/or utilizing a memory space corresponding to a space complexity of no more than an order of 1, e.g., with a relatively small order constant, for example, utilizing a constant memory space, e.g., of no more than ten N-bit words, assuming a machine having an N-bit word-size, which processes an N-bit string as a single word.

In one embodiment, extracting the base two logarithm from the solution number may include determining a first number based on a word size of the bitset; setting a second number to be equal to the solution number right shifted by the first number; if the second number is greater than zero, adding the second number to a third number, and setting the solution number to be equal to the second number; dividing the first number by two; repeating the setting of the second number, the adding, the setting of the solution number, and the dividing while the solution number is greater than one; and generating the pseudo-random number equal to the third number. According to this embodiment, generating the pseudo-random number based on the bitset constraint may be performed within a time period corresponding to a time complexity of no more than an order of the sum n+log N of the hamming weight n of the bitset and the number of bits N, for example, with an order constant of less than ten; and/or utilizing a memory space corresponding to a space complexity of no more than an order of 1.

In another embodiment, some machines, e.g., PowerPC, may implement a single machine instruction capable of returning a number of leading zeros in a binary representation of a number. Accordingly, extracting the base-two logarithm from the solution number may include applying such machines instruction to the solution number. According to this embodiment, generating the pseudo-random number based on the bitset constraint may be performed within a time period corresponding to a time complexity of no more than an order of n, for example, with an order constant of less than ten; and/or utilizing a memory space corresponding to a space complexity of no more than an order of 1.

In yet another embodiment, extracting the base-two logarithm from the solution number may include using a predetermined lookup table, which converts the value $2^i$ into the value i for any i=0...N−1. For example, the lookup table may include N entries based on a hash function (($2^i$)%p), wherein p is a predefined prime, and wherein % denotes the modulo operation. According to this embodiment, generating the pseudo-random number based on the bitset constraint may be performed within a time period corresponding to a time complexity of no more than an order of n, for example, with an order constant of less than ten, e.g., assuming the modulo operation is performed during a single instruction; and/or utilizing a memory space corresponding to a space complexity of no more than an order of N.

In some embodiments, the generating of the pseudo random number based on the bitset constraint may be associated with, or may be implemented as part of a pseudo random test generator, which may be used for simulation based verification, and may be required to generate values for instruction opcodes, satisfying a plurality of user defined and/or architecture defined constraints, e.g., which may be represented by the bitset constraint. Some embodiments may be applied in a context of post-silicon exercisers. In other embodiments, the generating of the pseudo random number based on the bitset constraint may be implemented as part of any other suitable method, device and/or system.

Reference is made to FIG. 1, which schematically illustrates a system 100 in accordance with some demonstrative embodiments.

In some embodiments, system 100 may include a PRNG 130 to pseudo randomly generate a number, denoted Rn, based on a bitset constraint, e.g., as described in detail below.

In some demonstrative embodiments, system 100 may include, for example, a processor 111, an input unit 112, an output unit 113, a memory unit 114, a storage unit 115, and/or communication unit 116. System 100 optionally includes other suitable hardware components and/or software components.

In some embodiments, PRNG 130 may be included in, associated with, or implemented as part of a test generator 120 to generate pseudo random values used, for example, in a hardware verification process. In some embodiments, test generator 120 may generate at least one test case 140 including values for instruction opcodes, satisfying a plurality of user defined and/or architecture defined constraints, e.g., which may be represented by one or more bitset constraints.

In some embodiments, PRNG 130 may receive, e.g., from test generator 120 an input including a bitset constraint; and may pseudo randomly generate the number Rn satisfying the bitset constraint, e.g., with a substantially uniform distribution over a set of possible solutions.

In some embodiments, PRNG 130 may determine a number, denoted Count, of possible solutions ("the possible solutions") satisfying the bitset constraint, e.g., by performing a first counting iteration of the possible solutions, e.g., as described in detail below. The number Count may be equal to the number n of non-zero bits in the bitset.

In some embodiments PRNG 130 may select, e.g., pseudo randomly, an index i representing a solution from the set of the possible solutions, wherein i belongs to the set $\{1, \ldots, \text{Count}\}$.

In some embodiments, PRNG 130 may generate the number Rn based on the index i, for example, by determining a solution number, denoted Rb, based on the index i; and extracting a base two logarithm from the solution number, e.g., as described in detail below.

In some embodiments, PRNG 130 may determine the solution number by performing a second counting iteration of the possible solutions, as described below.

In some embodiments, PRNG 130 may perform the first and the second counting iterations using a common or similar algorithm and/or executed using common or similar code. For example, PRNG 130 may perform the first and second counting iterations using a common predefined counting function capable of counting a number of solutions satisfying an input bitset constraint; and generating a solution number upon reaching a predefined input value, denoted k, or returning the number of solutions, e.g., if the value k is not reached. For example, PRNG 130 may perform the first counting iteration by applying the counting function to the bitset constraint, and the value k=MAX_INT, wherein MAX_INT denotes a selected value, greater than a maximal possible number of the possible solutions, e.g., MAX_INT=N+1 or more; and perform the second counting iteration by applying the same counting function to the bitset constraint, and the value k=i, e.g., after pseudo-randomly selecting the index i from the number of possible solutions determined at the first counting iteration.

In some embodiments, the first and the second counting iterations may be performed using a common or similar algorithm and/or executed using common or similar code. In other embodiments, the first and the second counting iterations may be performed using different algorithms and/or code.

In some embodiments, PRNG 130 may determine the solution number Rb based on the bitset constraint within a time period corresponding to a time complexity of no more than an order of the hamming weight n of the bitset, for example, with an order constant of less than ten; and/or utilizing a memory space corresponding to a space complexity of no more than an order of 1, e.g., with a relatively small order constant, for example, utilizing a constant memory space, e.g., of no more than ten N-bit words, assuming a machine having an N-bit word-size, which processes an N-bit string as a single word.

Figure 4:
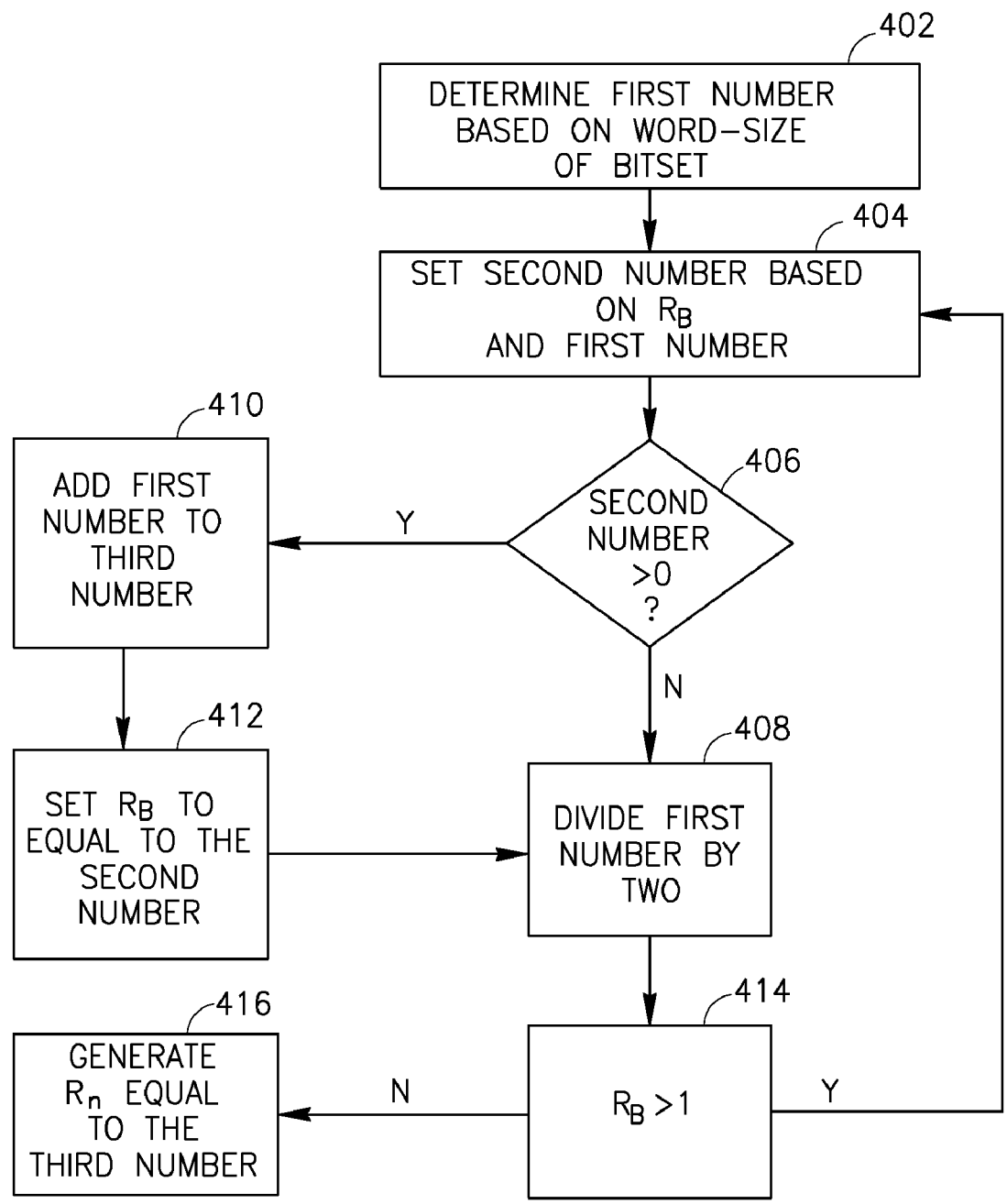
FIG. 4 is a schematic flow-chart illustration of a method of extracting a base-two logarithm from a number, in accordance with some demonstrative embodiments.

In one embodiment, PRNG 130 may extract the base two logarithm from the solution number by determining a first number based on a word size of the bitset; setting a second number to be equal to the solution number right shifted by the first number; if the second number is greater than zero, adding the second number to a third number, and setting the solution number to be equal to the second number; dividing the first number by two; repeating the setting of the second number, the adding, the setting of the solution number, and the dividing while the solution number is greater than one; and generating the pseudo-random number equal to the third number, e.g., as described below with reference to FIG. 4. According to this embodiment, PRNG 130 may generate the pseudo-random number based on the bitset constraint within a time period corresponding to a time complexity of no more than an order of the sum n+log N of the hamming weight n of the bitset and the number of bits N, for example, with an order constant of less than ten; and/or utilizing a memory space corresponding to a space complexity of no more than an order of 1.

In another embodiment, PRNG 130 may extract the base-two logarithm from the solution number by applying to the solution number a single machine instruction capable of returning a number of leading zeros in a binary representation of the solution number. According to this embodiment, PRNG 130 may generate the pseudo-random number based on the bitset constraint within a time period corresponding to a time complexity of no more than an order of n, for example, with an order constant of less than ten; and/or utilizing a memory space corresponding to a space complexity of no more than an order of 1.

In yet another embodiment, PRNG 130 may use a predetermined lookup table 132 to extract the base-two logarithm from the solution number. Lookup table 132 may be stored, for example, in storage 115.

In some embodiments, lookup table 132 may receive as an input the value of the solution number, e.g., $Rb=2^j$, and return the value j, for any j=0 ... N−1. For example, lookup table 132 may include up to p entries based on a hash function $((2^j)\%p)$, wherein p is a predefined prime, and wherein % denotes the modulo operation, e.g., as described in detail below. In other embodiments, lookup table 132 may include any other suitable number of entries, for example, up to $2^N$, e.g., about p entries, which may be determined in any other suitable manner, which may or may not be based on the hash function and/or the prime p.

In some embodiments, using certain values of the prime p may result in a "collision free" hash function. For example, the primes 37, 67, 131, 269, and 523 may be used for the word-sizes N of 32, 64, 128, 256, and 512, respectively. In one example, lookup table 132 may include the following table, e.g., for the word-size N=32:

TABLE 1

| K = $(2^j)\%37$ | j |
|---|---|
| 1 | nan |
| 2 | nan |
| 3 | 1 |
| 4 | 26 |
| 5 | 2 |
| 6 | 23 |
| 7 | 27 |
| 8 | 32 |
| 9 | 3 |
| 10 | 16 |
| 11 | 24 |
| 12 | 30 |
| 13 | 28 |
| 14 | 11 |
| 15 | nan |
| 16 | 13 |
| 17 | 4 |
| 18 | 7 |
| 19 | 17 |
| 20 | nan |
| 21 | 25 |
| 22 | 22 |

TABLE 1-continued

| K = $(2^j)\%37$ | j |
|---|---|
| 23 | 31 |
| 24 | 15 |
| 25 | 29 |
| 26 | 10 |
| 27 | 12 |
| 28 | 6 |
| 29 | nan |
| 30 | 21 |
| 31 | 14 |
| 32 | 9 |
| 33 | 5 |
| 34 | 20 |
| 35 | 8 |
| 36 | 19 |
| 37 | 18 |

For example, lookup table 132 may receive as an input the value of $2^j$, and provide an output including the value of j by providing the value of the K-th entry of Table 1, wherein $K=(2^j) \% 37$. The notation "nan" corresponding to an entry K' denotes that there is no value $0<=j<=31$ satisfying $(2^j) \% 37=K'$ and therefore there should be no access to this entry.

According to this embodiment, generating the pseudo-random number based on the bitset constraint may be performed within a time period corresponding to a time complexity of no more than an order of n, for example, with an order constant of less than ten; and/or utilizing a memory space corresponding to a space complexity of no more than an order of N.

In some demonstrative embodiments, processor 111 includes, for example, a central processing unit (CPU), a digital signal processor (DSP), a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller.

In some demonstrative embodiments, input unit 112 includes, for example, a keyboard, a keypad, a mouse, a touch-pad, a stylus, a microphone, or other suitable pointing device or input device. Output unit 113 include, for example, a cathode ray tube (CRT) monitor or display unit, a liquid crystal display (LCD) monitor or display unit, a screen, a monitor, a speaker, or other suitable display unit or output device.

In some demonstrative embodiments, memory unit 114 includes, for example, a random access memory (RAM), a read only memory (ROM), a dynamic RAM (DRAM), a synchronous DRAM (SD-RAM), a flash memory, a volatile memory, a non-volatile memory, a cache memory, a buffer, a short term memory unit, a long term memory unit, or other suitable memory units or storage units. Storage unit 115 includes, for example, a hard disk drive, a floppy disk drive, a compact disk (CD) drive, a CD-ROM drive, a digital versatile disk (DVD) drive, or other suitable removable or non-removable storage units. Memory unit 114 and/or storage unit 115 may, for example, store data processed by system 100.

In some demonstrative embodiments, communication unit 116 includes, for example, a wired or wireless network interface card (NIC), a wired or wireless modem, a wired or wireless receiver and/or transmitter, a wired or wireless transmitter-receiver and/or transceiver, a radio frequency (RF) communication unit or transceiver, or other units able to transmit and/or receive signals, blocks, frames, transmission streams, packets, messages and/or data. Communication unit 116 may optionally include, or may optionally be associated with, for example, one or more antennas, e.g., a dipole antenna, a monopole antenna, an omni-directional antenna, an end fed antenna, a circularly polarized antenna, a microstrip antenna, a diversity antenna, or the like.

In some demonstrative embodiments, the components of system 100 are enclosed in, for example, a common housing, packaging, or the like, and are interconnected or operably associated using one or more wired or wireless links. In other embodiments, for example, components of system 100 may be distributed among multiple or separate devices, may be implemented using a client/server configuration or system, may communicate using remote access methods, or the like.

Figure 2:
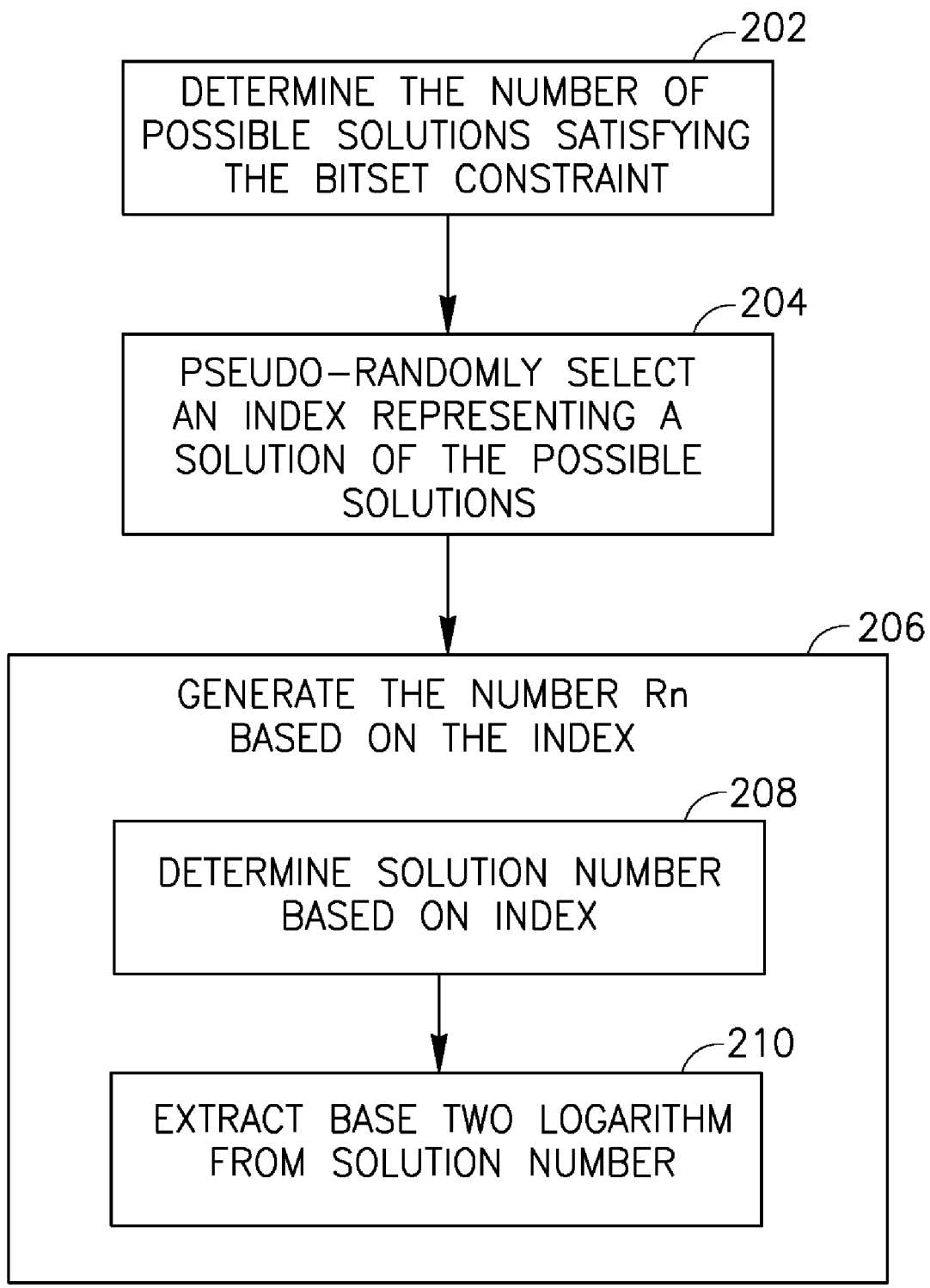
FIG. 2 is a schematic flow-chart illustration of a method of pseudo randomly generating a number satisfying a bitset constraint, in accordance with some demonstrative embodiments.

Reference is made to FIG. 2, which schematically illustrates a method of generating a pseudo random number satisfying a bitset constraint, in accordance with some demonstrative embodiments. In some non-limiting embodiments, one or more operations of the method of FIG. 2 may be implemented, for example, by one or more elements of a system, e.g., system 100 (FIG. 1), for example, a PRNG, e.g., PRNG 130 (FIG. 1), and/or by other suitable units, devices and/or systems.

As indicated at block 202, the method may determine the number Count of possible solutions satisfying the bitset constraint, e.g., based on an input including the bitset. For example, determining the number Count may include performing a first counting iteration, e.g., by applying a predefined counting function (procedure), denoted bitsetGenCount, to the values bitset, and MAX_INT, e.g., as described below with reference to FIG. 3.

As indicated at block 204, the method may include pseudo randomly selecting an index representing a solution of the possible solutions. Pseudo randomly selecting the index may include, for example, applying a pseudo random-number-selecting function, for example, the function rand or any other suitable function, to pseudo randomly select a number with a uniform distribution from a range of numbers of a size corresponding to the number Count, e.g., from a set of numbers {1 ... Count}.

As indicated at block 206, the method may include generating the number Rn, based on the pseudo-randomly selected index.

As indicated at block 208, determining the number Rn may include determining a number ("the solution number"), denoted Rb, based on the index, e.g., as described below.

As indicated at block 210, determining the number Rn may include extracting a base two logarithm from the number Rb, for example, using any suitable method and/or algorithm, e.g., as described herein.

In some embodiments, generating the number Rb may include performing a second counting iteration, e.g., by applying the function CountGen to the value bitset and the index i, e.g., as described below with reference to FIG. 3.

Figure 3:
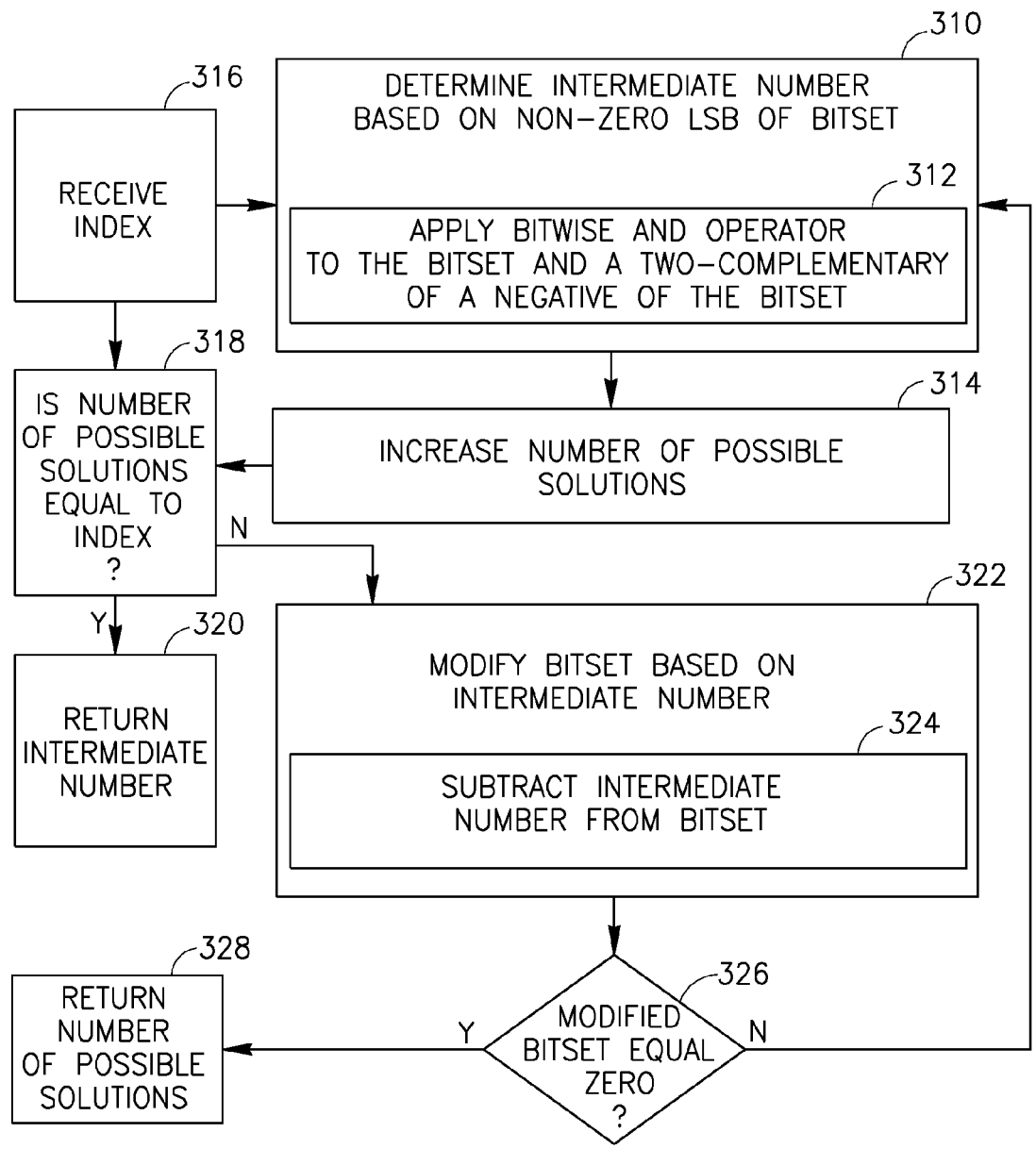
FIG. 3 is a schematic flow-chart illustration of a method of counting one or more possible solutions satisfying a bitset constraint, in accordance with demonstrative embodiments.

Reference is made to FIG. 3, which schematically illustrates a method of counting one or more possible solutions satisfying a bitset constraint, in accordance with demonstrative embodiments. In some non-limiting embodiments, one or more operations of the method of FIG. 3 may be included in, or implemented by, for example, a part of one or more operations of a method of generating a pseudo random number based on a bitset constraint, e.g., the method of FIG. 2; and/or one or more elements of a system, e.g., system 100 (FIG. 1), for example, a PRNG, e.g., PRNG 130 (FIG. 1), and/or by other suitable methods, units, devices and/or systems.

In some embodiments, one or more operations of the method of FIG. 3 may be implemented to count the number of possible solutions satisfying a bitset constraint, e.g., as described above with reference to block 202 (FIG. 2), e.g., as described below.

In some embodiments, one or more operations of the method of FIG. 3 may be implemented to determine a solution number, e.g., the number Rb, based on an index, e.g., the index i, e.g., as described above with reference to block 208 (FIG. 2), e.g., as described below.

As indicated at block 310, the method may include determining an intermediate number, denoted nextbit, based on a non-zero LSB of the bitset. The intermediate number may be determined, for example, to be equal to two to the power of an index, denoted 1, of the non-zero LSB of the bitset. For example, a binary string representing the intermediate number may include an l-th bit having the value "1", and substantially all other bits having the value "0".

As indicated at block 312, determining the intermediate number may include applying a bitwise "AND" logical operator, also denoted "&", to the bitset and a two-complement representation of a negative of the bitset, e.g., by performing the logical operation "bitset&-bitset". In some embodiments, the method of FIG. 3 may be performed, for example, using an N word-size and utilizing two-complement arithmetic to represent, and to perform operations, involving negative integers. In such embodiments, for example, the intermediate number may be represented by the binary string resulting from the operation bitset&-bitset. The intermediate number resulting from this operation may include one bit corresponding to the non-zero LSB of the bitset, having a value "1"; and other bits, e.g., substantially all other bits, having a value "0".

As indicated at block 314, the method may include increasing a total number of possible solutions, e.g., by one. For example, the number Count may be initialized, e.g., by setting the number Count to zero prior to performing the method of FIG. 3; and the number Count may be increased, e.g., by one, for example, after each iteration of the operation of block 310.

As indicated at block 318, the method may include determining whether or not the counted number of possible solutions is equal to an index. For example, as indicated at block 316, the index may be received as an input. The input index may include, for example, the value MAX_INT, e.g., when performing the first counting iteration as described above; or the selected index i, e.g., when performing the second counting iteration as described above.

As indicated at block 320, the method may include outputting the intermediate number, e.g., if the counted number of possible solutions is equal to the input index. The counted number of possible solutions may be equal to the input index, for example, during the second counting iteration, thereby indicating the solution corresponding to the selected index. Accordingly, the solution number Rb may include the intermediate number outputted at block 320.

As indicated at block 322, the method may include modifying the bitset based on the intermediate number, e.g., if the counted number of possible solutions is less than the input index.

As indicated at block 324, modifying the bitset based on the intermediate number may include subtracting the intermediate number from the bitset.

As indicated at block 326, the method may include determining whether or not there are any additional non-zero bits in the modified bitset, e.g., determining whether or not the modified bitset is equal to zero. The method may include repeating the determining of the intermediate number based on the modified bitset, as indicated at block 310; increasing the number of possible solutions, as indicated at block 314; and modifying the bitset based on the intermediate number, as indicated at block 322, e.g. until either reaching the input index or iterating over all non-zero bits of the bitset.

As indicated at block 328, the method may include returning the counted number of possible solutions, e.g., if the modified bitset is equal to zero.

In some embodiments, one or more operations of the method of FIGS. 2 and/or 3, e.g., the operations described above with reference to blocks 202, 204, and/or 208 (FIG. 2), may be implemented using any suitable computer readable program including a computer code, for example, written in a "C" computer language or any other suitable language, for example, using one or more lines of the following code including the following functions bitsetGenCount and bitsetGen:

```
020
021 int bitsetGenCount(int bitset,int selectedBit)
022 {
023   int count=0;
024   while (bitset) {
025     int nextBit = bitset&-bitset;
026     ++count;
027     if (count==selectedBit)
028       return nextBit;
029     bitset -= nextBit;
030   }
031   return count;
032 }
033
034 int bitsetGen(int bitset)
035 {
036   int P=bitsetGenCount(bitset,N+1);
037   int randomBit=bitsetGenCount(bitset,rand(1,P));
038   return randomBit;
039 }
```

In some demonstrative embodiments, the function bitsetGenCount may receive as input a bitset constraint, and a bit index, denoted selectedBit; and provide an output including either the number of non-zero bits in the bitset constraint, e.g., if the index selectedBit is greater than the number of non-zero bits in the bitset constraint; or $2^{B(i)}$, wherein i=selectedBit and B(i) denotes an i-th non-zero bit of the bitset B, e.g., if the bit index selectedBit is equal to or lesser than the number of non-zero bits in the bitset constraint. The function bitsetGenCount may perform, for example, one or more operations of the method described above with reference to FIG. 3. For example, at line 023 the value of the number Count may be initialized to zero. Lines 024-030 may be repeated to iteratively remove the least significant non-zero bits from the bitset, while updating the value of the number Count, e.g., until either all the least significant non-zero bits are removed or until reaching a bit index equal to the index selectedBit. Specifically, at line 025 a least significant non-zero bit may be detected, e.g., as described above with reference to block 310 (FIG. 3); at line 026 the value of the number Count may be increased to represent the detection of the least significant non-zero bit, e.g., as described above with reference to block 314 (FIG. 3); at line 027 it is determined whether or not the detected bit is the bit identified by the index selectedBit, e.g., as described above with reference to block 318 (FIG. 3); at line 028 the intermediate number corresponding to the detected bit may be returned, if the detected bit is the bit identified by the index selectedBit, e.g., as described above with reference to block 320 (FIG. 3); and at line 029 the bitset may be modified, if the detected bit is not the bit identified by the index selectedBit, e.g., as described above with reference to block 322 (FIG. 3). At line 031 the value of the number Count may be returned, after all non-zero bits of the bitset have been iterated over, e.g., as described above with reference to block 328 (FIG. 3).

In one example, the function bitsetGenCount may receive the input (101000, 1) and provide the output "1000", e.g., including the value corresponding to the first non-zero bit of the input bitset, since the input index "1" is lesser than the number of non-zero bits in the input bitset. In another example, the function bitsetGenCount may receive the input (101000, 2) and provide the output "100000", e.g., including the value corresponding to the second non-zero bit of the input bitset, since the input index "2" is equal to the number of non-zero bits in the input bitset. In a further example, the function bitsetGenCount may receive the input (101000, 3) and provide the output "2", e.g., including the number of non-zero bits of the input bitset, since the input index "3" is greater than the number of non-zero bits in the input bitset. In a further example, the function bitsetGenCount may receive the input (101000, 4) and provide the output "2", e.g., including the number of non-zero bits of the input bitset, since the input index "4" is greater than the number of non-zero bits in the input bitset.

In some demonstrative embodiments, the function bitsetGen may receive a bitset constraint as input, and provide the output $2^i$, wherein bitset(i)=1, and i is pseudo-randomly selected with uniform distribution form the set {0<=i<N such that bitset(i)=1} including the possible solutions satisfying the bitset constraint, e.g., as described above. The function bitsetGen may perform, for example, one or more operations of the method described above with reference to FIG. 2.

In one example, the function bitsetGen may receive the input (101000) and provide either one of the outputs "100000" and "1000", e.g., with equal probability.

In some embodiments, the function bitsetGen may perform a first counting iteration to determine the number of possible solutions satisfying the bitset constraint; and a second counting iteration of the possible solutions, e.g., until reaching a pseudo-randomly selected index corresponding to one of the solutions.

In some embodiments, the function bitsetGen may perform the first and second counting iterations using a common or similar algorithm and/or executed using common or similar code, e.g., the code of the function bitsetGenCount. For example, at line 036 the function bitsetGenCount may be called with the input (bitset,N+1), e.g., resulting in the number Count of non-zero bits in the bitset constraint, since an N+1-th bit will not be detected as there are only N bits in the word. At line 037 the function bitsetGenCount may be called with the input including a number pseudo-randomly selected from the range {1 . . . Count}. In other embodiments, the first and second counting iterations may be performed using any other suitable algorithm and/or code.

As described above, in some embodiments a base two logarithm of a binary mask, which include a single "on" bit having the value "1", may be computed in order to determine the index of the bit, e.g., determining the number "4" corresponding to the binary mask "00010000".

Reference is now made to FIG. 4, which schematically illustrates a method of extracting a base-two logarithm from a number, in accordance with some demonstrative embodiments. In some non-limiting embodiments, one or more operations of the method of FIG. 4 may be included in, or implemented by, for example, a part of one or more operations of a method of generating a pseudo random number based on a bitset constraint, e.g., the method of FIG. 2; and/or one or more elements of a system, e.g., system 100 (FIG. 1), for example, a PRNG, e.g., PRNG 130 (FIG. 1), and/or by other suitable methods, units, devices and/or systems. For example, one or more operations of the method of FIG. 4 may be implemented to extract the base two logarithm from the solution number Rb, as described above with reference to block 210 (FIG. 2).

As indicated at block 402, the method may include determining a first number, denoted divisor, based on the word size N of the bitset. For example, the first number may be equal to half of the word size N, e.g., divisor=16 if N=32.

As indicated at block 404, the method may include setting a second number, denoted temp, based on the number Rb and the first number. For example, the number temp may be determined by left shifting the number Rb by the first number, e.g., temp=bit>>divisor.

As indicated at block 406, the method may include determining whether or not the second number is greater than zero.

In some embodiments, if the second number is greater than zero, then the method may include adding the first number to a third number, denoted res, e.g., res+=divisor, as indicated at block 410; and setting the number Rb to be equal to the second number, e.g., as indicated at block 412. The third number may be initialized, e.g., set to zero, for example, prior to performing the operation of block 404.

As indicated at block 408, the method may include dividing the first number by two, e.g., by performing a single left shift to the first number.

As indicated at block 414, the method may include repeatedly performing the operations of blocks 404, 406, 408, 410, and 412, e.g., as long as the number Rb is greater than one.

As indicated at block 416, the method may include returning the third number as the output, for example, by generating the number Rn equal to the number res, e.g., if the number Rb is not greater than one.

In some embodiments, one or more operations of the method of FIG. 4 may be implemented using any suitable computer readable program including a computer code, for example, written in a "C" computer language or any other suitable language, for example, using one or more lines of the following code including the following function log 2:

```
040
041 int log2(int bit)
042 {
043   int divisor=N/2;
044   int res=0;
045   while (bit>1) {
046     int temp = bit>>divisor;
047     if (temp) {
048       res+=divisor;
049       bit=temp;
050     }
051     divisor >>= 1;
052   }
053   return res;
054 }
```

The function log 2 may receive an input number, denoted bit, e.g., the number Rn, having a 32-bit word size; and provide the output res equal to the base-two logarithm of the input number bit.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method of generating a pseudo random number satisfying a bitset constraint, the method comprising:
   determining a number of possible solutions satisfying the bitset constraint;
   selecting an index representing a solution of the possible solutions; and
   generating the pseudo-random number based on the index;
   wherein determining the number of possible solutions satisfying the bitset constraint comprises:
   determining an intermediate number representing a possible solution based on a non-zero least-significant-bit (LSB) of the bitset;
   increasing a total number of possible solutions;
   modifying the bitset based on the intermediate number; and
   repeating the determining, increasing, and modifying for one or more other non-zero LSBs of the bitset.

2. The method of claim 1, wherein determining the intermediate number comprises applying a bitwise AND operator to the bitset and a two-complementary representation of a negative of the bitset.

3. The method of claim 1, wherein the intermediate number is equal to two to the power of an index of the non-zero LSB.

4. The method of claim 1, wherein the modifying comprises subtracting the intermediate number from the bitset.

5. The method of claim 1, wherein generating the pseudo-random number comprises: determining a solution number based on the index; and extracting a base two logarithm from the solution number.

6. The method of claim 5, wherein determining the solution number comprises:
   determining an intermediate number based on a non-zero LSB of the bitset;
   modifying the bitset based on the intermediate number; and repeating the determining and modifying for a number of times corresponding to the index.

7. The method of claim 5, wherein extracting the base two logarithm comprises:
determining a first number based on a word size of the bitset;
setting a second number to be equal to the solution number right shifted by the first number;
if the second number is greater than zero, adding the first number to a third number, and setting the solution number to be equal to the second number; dividing the first number by two;
repeating the setting of the second number, the adding, the setting of the solution number, and the dividing while the solution number is greater than one; and generating the pseudo-random number equal to the third number.

8. The method of claim 1 comprising determining the number of possible solutions and generating the pseudo random number using a common algorithm.

9. An apparatus comprising:
a processor;
a pseudo random number generator to generate a pseudo random number satisfying a bitset constraint by determining a number of possible solutions satisfying the bitset constraint; selecting an index representing a solution of the possible solutions; and generating the pseudo-random number based on the index;
wherein the pseudo random number generator is capable of determining the number of possible solutions satisfying the bitset constraint by determining an intermediate number representing a possible solution based on a non-zero least-significant-bit (LSB) of the bitset; increasing a total number of possible solutions; modifying the bitset based on the intermediate number; and repeating the determining, increasing, and modifying for one or more other non-zero LSBs of the bitset.

10. The apparatus of claim 9, wherein the intermediate number is equal to two to the power of an index of the non-zero LSB.

11. The apparatus of claim 9, wherein the pseudo random number generator is capable of generating the pseudo-random number by determining a solution number based on the index; and extracting a base two logarithm from the solution number.

12. The apparatus of claim 11, wherein the pseudo random number generator is capable of determining the solution number by determining an intermediate number based on a non-zero LSB of the bitset; modifying the bitset based on the intermediate number; and repeating the determining and modifying for a number of times corresponding to the index.

13. The apparatus of claim 11, wherein the pseudo random number generator is capable of extracting the base two logarithm by determining a first number based on a word size of the bitset; setting a second number to be equal to the solution number right shifted by the first number; if the second number is greater than zero, adding the first number to a third number, and setting the solution number to be equal to the second number; dividing the first number by two; repeating the setting of the second number, the adding, the setting of the solution number, and the dividing while the solution number is greater than one; and generating the pseudo-random number equal to the third number.

14. The apparatus of claim 9, wherein the pseudo random number generator uses a common algorithm to determine the number of possible solutions and to generate the pseudo random number based on the index.

15. A computer program product comprising a non-transitory computer-useable medium including a computer-readable program, wherein the computer-readable program when executed on a computer causes the computer to:
generate a pseudo random number satisfying a bitset constraint by determining a number of possible solutions satisfying the bitset constraint; selecting an index representing a solution of the possible solutions; and generating the pseudo-random number based on the index;
wherein the computer-readable program causes the computer to determine the number of possible solutions satisfying the bitset constraint by determining an intermediate number representing a possible solution based on a non-zero least-significant-bit (LSB) of the bitset; increasing a total number of possible solutions;
modifying the bitset based on the intermediate number; and repeating the determining, increasing, and modifying for one or more other non-zero LSBs of the bitset.

16. The computer program product of claim 15, wherein the computer-readable program causes the computer to generate the pseudo-random number by determining a solution number based on the index; and extracting a base two logarithm from the solution number.

17. The computer program product of claim 15, wherein the computer-readable program causes the computer to use a common algorithm to determine the number of possible solutions and to generate the pseudo random number based on the index.

\* \* \* \* \*